US012640834B2

(12) United States Patent
Johnston

(10) Patent No.: US 12,640,834 B2
(45) Date of Patent: May 26, 2026

(54) INTERNAL CARD READER SKIMMER DISRUPTER

(71) Applicant: NCR Atleos Corporation, Atlanta, GA (US)

(72) Inventor: Kevan Douglas Johnston, Stirling (GB)

(73) Assignee: NCR Atleos Corporation, Atlanta, GA (US)

( * ) Notice: Subject to any disclaimer, the term of this patent is extended or adjusted under 35 U.S.C. 154(b) by 0 days.

(21) Appl. No.: 18/914,682

(22) Filed: Oct. 14, 2024

(65) Prior Publication Data

US 2025/0038880 A1     Jan. 30, 2025

Related U.S. Application Data

(63) Continuation of application No. 17/876,841, filed on Jul. 29, 2022, now Pat. No. 12,206,491.

(51) Int. Cl.
H04K 3/00     (2006.01)
G06K 7/00     (2006.01)
(52) U.S. Cl.
CPC .............. H04K 3/86 (2013.01); G06K 7/0069 (2013.01); H04K 3/45 (2013.01); H04K 3/825 (2013.01)

(58) Field of Classification Search
CPC   H04K 3/86; H04K 3/45; H04K 3/825; G06K 7/0069
USPC ...................................... 340/572.8
See application file for complete search history.

(56) References Cited

U.S. PATENT DOCUMENTS

| | | | |
|---|---|---|---|
| 12,206,491 B2 * | 1/2025 | Johnston ............. | G07F 19/2055 |
| 2017/0185811 A1 * | 6/2017 | Hoson .................. | G06K 7/0008 |

* cited by examiner

*Primary Examiner* — Ahshik Kim
(74) *Attorney, Agent, or Firm* — Schwegman Lundberg & Woessner, P.A.

(57) ABSTRACT

A dual antiphase read-head arranged card reader is provided. The card reader includes a first read-head arrangement and a second read-head arrangement. Electromagnetic noise is applied to both the first and second arrangements. Waves associated with the electromagnetic noise on the second arrangement is transformed and applied to the first arrangement canceling the noise on a first read head of the first arrangement. The first read head reads magnetically encoded information on a magnetic strip of a card inserted into a card slot of the card reader free of noise. However, the noise remains present such that any skimmer read head of a skimmer inserted into the card slot is unable to read the magnetically encoded information off the magnetic strip of the card.

16 Claims, 4 Drawing Sheets

200

INTERNAL CARD READER SKIMMER DISRUPTER

CROSS-REFERENCE TO RELATED APPLICATION

This application is a continuation of U.S. patent application Ser. No. 17/876,841, filed Jul. 29, 2022, which application and publication is incorporated herein by reference in its entirety.

BACKGROUND

Motorized card readers are being subjected to skimmers. Skimmers are small devices inserted into a card reader slot that is close to the card reader's read head allowing a customer's magnetic encoded account information to be stolen during a transaction from a low profile magnetic read head mounted under a track 2 path of the magnetic card strip and on top of the skimmer head. Skimmers are so small and unobtrusive it is difficult to visually detect the skimmer assembly from the card reader's slot. In fact, skimmers are only 1 to 2 mm thick which limits the skimmer's magnetic read performance.

A variety of techniques have been tried to thwart this type of theft. For instance, electromagnetic disrupters electromagnetically induce noise on the card reader's read head when no card is present, or no transaction is detected at a terminal. However, the disrupters also prevent the card reader's read head from reading the magnetically encoded card information. As a result, the disrupters are turned off when a transaction is detected at a terminal and a card is detected in the motorized card reader's slot. This means that skimmers can still capture the track 2 encoded card information during a transaction.

Moreover, even if the motorized card read is also a chip reader, some customers may not have chip-based cards or the chips embedded in their card may be damaged, such that there are still situations in which the magnetic strip needs to be read for a transaction. Therefore, it is generally not practical to keep the disrupter active at all times.

What is needed is a card reader that includes an internal disrupter mechanism that does not prevent the card reader's track 2 read head from reading the magnetically encoded card information. At the same time the disruptive magnetic signals should be maintained within the card reader such that any skimmer placed in the card slot is unable to read the track 2 information from the card.

SUMMARY

In various embodiments, a card reader, a method of operating a card reader, and a system for a card reader are presented for preventing skimmers from reading magnetically encoded information on magnetic strips of cards. A dual antiphase read-head motorized card reader is provided. Electromagnetic noise is applied on both a first read head and a second read head. An antiphase connection between the second read head and the first read head transforms the electromagnetic waves associated with the electromagnetic noise on the second read head 180 degrees and the transformed waves are applied to the first read head. This cancels the electromagnetic noise signals on the first read head and permits the first read head to read magnetic encoded information on a magnetic strip of a card inserted into a card slot of the card reader. At the same time, the electromagnetic noise signal is still present to any skimmer read head that was inserted into the card slot preventing the skimmer read head from reading the magnetic encoded information off the magnetic strip of the card.

According to an aspect, a card reader that prevents a skimmer from reading a card's magnetic strip is presented. The card reader includes a first read-head arrangement and a second read-head arrangement. When electromagnetic noise is applied on a first read head of the first read-head arrangement and a second read head of the second read-head arrangement, the noise is canceled out on the first read head permitting the first read head to read a magnetic strip of a card while the electromagnetic noise remains and interferes with any skimmer inserted into a card slot of the card reader.

DETAILED DESCRIPTION

As stated above, skimmers are a big problem in the industry. Thieves are continuously modifying these devices to adapt to solutions provided in the industry. Current approaches rely an electromagnetic disruptive signals placed on a card reader's read head, which is intentionally turned off when a card is present in the card slot and a transaction is detected at the corresponding terminal so that the card reader's read head is capable of reading the magnetic encoded information off the card. Yet, this provides an opportunity to enable a skimmer to also read the magnetically encoded information off the card.

A typical magnetic strip on a card includes three tracks, a card reader's read head is designed to align with track 2 as close to the center of track 2 as is feasible. Generally, track 1 and track 3 are not read. A motorized card reader is one in which the customer is not asked to quickly swipe the card in and out of the slot but one in which when the customer places the card in the slot, the card is grabbed and moved into proper position for reading within the slot. Motorized card readers are typically used for chip-enabled card readers where pins in the chip are aligned to pins within the reader. However, motorized card readers are also able to read the magnetic strip of the card via a magnetic-enabled read head.

The teachings that follow provide a novel motorized card reader that includes an internal disrupter, which does not disrupt the read head of the card reader, but which does disrupt any read head of any skimmer placed within the slot of the card reader. The card reader and its internal disrupter is now discussed within initial reference to FIG. 1A.

Figure 1A:
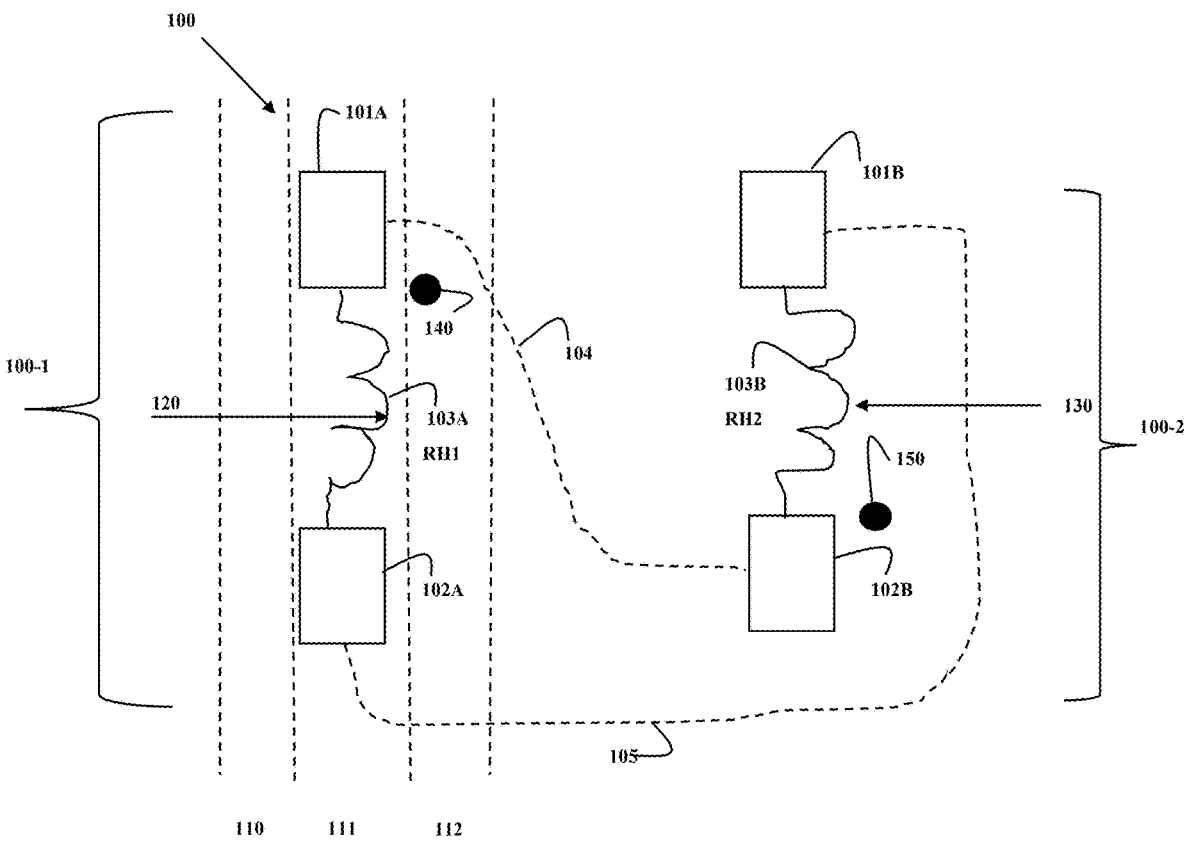
FIG. 1A is a diagram of card reader that includes an internal disrupter mechanism to prevent skimmers from reading a card's magnetic strip, according to an example embodiment.

FIG. 1A is a diagram of a card reader 100 along with other details illustrated to facilitate comprehension of an internal disrupter 100-1, according to an example embodiment. It is to be noted that the components are shown schematically in greatly simplified form, with only those components relevant to understanding of the embodiments being illustrated.

Furthermore, the various components (that are identified in the FIG. 1A) are illustrated and the arrangement of the components is presented for purposes of illustration only. It is to be noted that other arrangements with more or fewer components are possible without departing from the teachings of a card reader's internal skimmer disruption mechanisms, presented herein and below.

Card reader 100 includes a read-head portion 100-1 and an internal skimmer disrupter portion 100-2. The read-head portion 100-1 includes a first terminal 101A, a second terminal 102A, and a read head 103A (also labeled read head 1 (RH1) in FIG. 1A). The internal skimmer disrupter portion 100-2 includes a first terminal 101B, a second terminal 102B, a dummy or inoperable read head 103B (also labeled RH2 in FIG. 1A), a first wired connection 104 between the second terminal 102B of the disrupter portion 100-2 and the first terminal 101A of the read-head portion 100-1, and a second wired connection 105 between the first terminal 101B of the disrupter portion 100-2 and the second terminal 102A of the read-head portion 100-1. The read-head portion 100-1 is affixed inside the card reader 100 at 140 and the disrupter portion 100-2 is affixed inside the card reader at 150. The read-head portion 100-1 and the disrupter portion 100-2 are internal components of the card reader 100.

Magnetically induced noise 120 is injected onto read head 103A and the same noise 130 is injected onto dummy or inoperable read head 103B. The connections 104 and 105 between the read-head portion 100-1 and the disrupter portion 100-2 create an antiphase. That is the electromagnetic wave amplitude of noise 130 has a phase difference of 180 degrees through the connections 104 and 105 onto the read head 103A. This essentially cancels the noise out on read head 103A and ensures that read head 103A can read track 2 111 of any card inserted into a card slot of the card reader 100. where the magnetic waves associated with the noise 120 on read head 103A are inverted or have a phase difference of 180 degrees. The magnetically induced noise 120 and 130 is provided by a disruptive circuit of the card reader 100. In an embodiment, the disruptive circuit that provides the noise 120 and 130 are pre-existing within the card reader 100 with the added disrupter portion 100-2. In an embodiment, the disruptive circuit is added to the card reader 100 with the disrupter portion 100-2.

Notice that track 1 110 and track 3 112 may not be read by card reader 103A, since some card readers no not read these tracks. Second or dummy read head 103B is placed close to or aligned with track 3. Card reader 103A only needs to read a cards magnetically encoded information from track 2 111. The card slot and reader 103A are arranged such that when the card is drawn into the card reader 103A, track 2 of the magnetic strip sits over reader 103A.

Figure 1B:
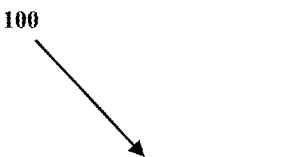
FIG. 1B is another diagram of the card reader of FIG. 1A, according to an example embodiment.
Figure 1B:
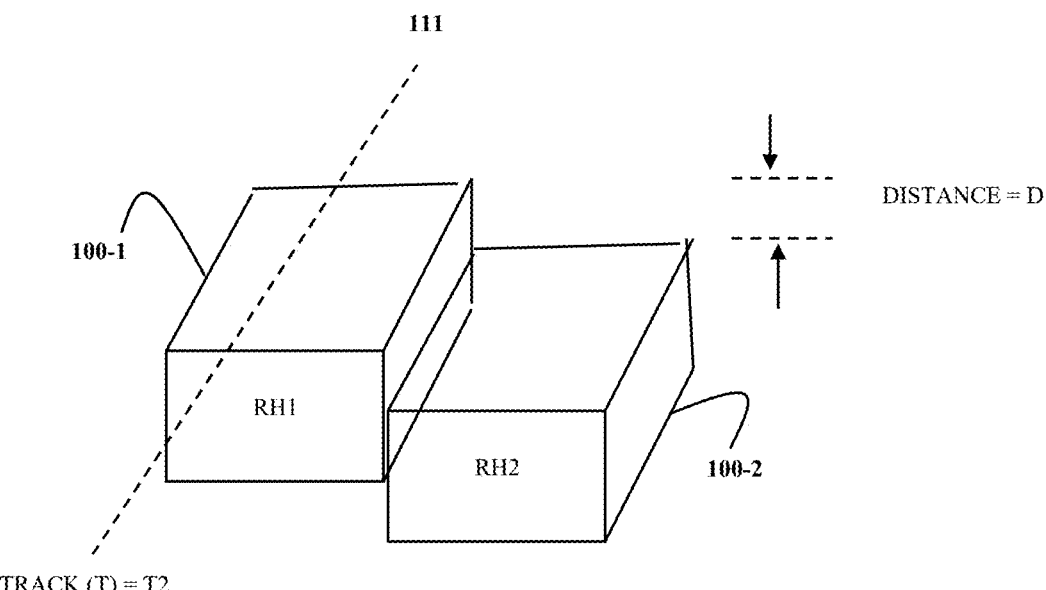

FIG. 1B is another perspective of the card reader 100, according to an embodiment. The read-head portion 100-1 and the disrupter portion 100-2 are offset by a distance (D) such that vertically the read-head portion 100-1 sits above and adjacent to the disrupter portion 100-2. It is noted that other arrangements are also possible. In an embodiment, the offset distance D is approximately 1 to 2 mm. This distance and arrangement ensures that any skimmer placed in the card slot of the card reader is unable to read track 1 110 and track 3 112 should the skimmer's design try to avoid reading track 2 because of the electromagnet noise 120 and 130.

Motorized card reader 100 includes a dual anti-phase read head arrangement and internal read-head portion 100-1 and disrupter portion 100-2, which allows an electromagnetic disrupter (disruptive circuit) to remain active at all times that the card reader 100 is powered on. The read-head 103A is able to read track 2 111 of the card because of the noise cancelation created on read-head 103A by connections 104 and 105 of the disrupter portion 100-2. The offset distance between the read-head portion 100-1 and the disrupter portion 100-2 ensures that any thief cannot attempt a costly redesign of a skimmer in an attempt to read track 1 110 or track 3 112. Thus, the offset distance is a factor in making it more difficult for a thief to redesign a skimmer and any such skimmer would need to accommodate two read heads in close physical proximity to one another to get good noise cancelation. Should a thief attempt a differential read-head arrangement for a skimmer redesign, the size, the cost, and the complexity of such a skimmer would make the skimmer more detectable by other techniques. The implementation of such a redesigned skimmer would be larger and more detectable. Card reader 100 efficiently and effectively prevents skimmers from reading magnetic card information from cards inserted into the card slot of the reader 100.

Figure 2:
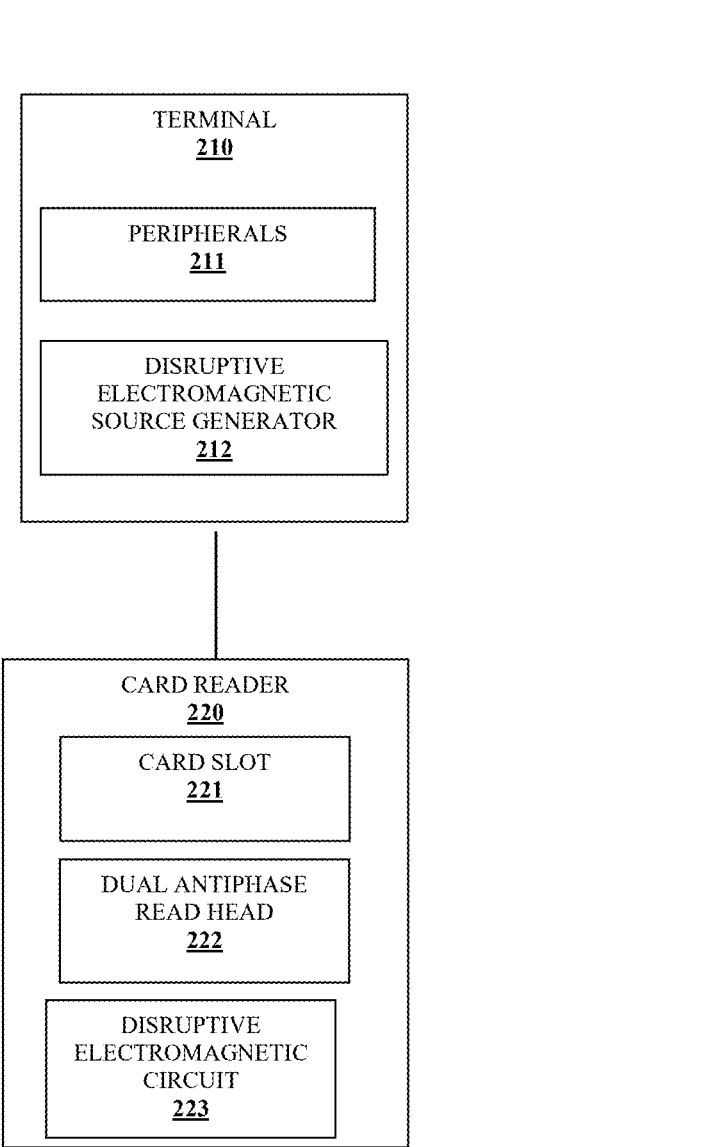
FIG. 2 is a diagram of a system for a card reader that includes an internal disrupter mechanism to prevent skimmers from reading a card's magnetic strip, according to an example embodiment.

FIG. 2 is a diagram of a system 200 for preventing skimmers from reading magnetic information off of a magnetically encoded strip of a card, according to an embodiment. The system 200 includes a terminal 210 and a card reader 220.

The terminal 210 includes peripherals 211 some of which are internal to the terminal and some of which are externally interfaced to the terminal 210. Example peripheral 211 may include a media depository, a scanner, a scale, a combined scanner and scale, a touch display, a media dispenser, a receipt printer, a Personal Identification Number (PIN) pad, an encrypted PIN pad, a bag scale, a keypad, etc. Optionally, the terminal 210 includes a disruptive electromagnetic source generator 212.

Card reader 220 is one of the peripherals 211 provided as an internally integrated peripheral. Card reader 220 includes a card slot 221 and a dual antiphase read head 222. Optionally, the card reader 220 includes a disruptive electromagnetic circuit 223 that generates the electromagnetic noise signals on the dual antiphase read head 222.

The dual antiphase read head 222 includes a first read head and a dummy read head connected in antiphase to the first read head. Both read heads receive electromagnetic noise signals from either the disruptive electromagnetic source generator 212 of the terminal 210 or from the disruptive electromagnetic circuit 223 of the card reader 220. The electromagnetic waves associated with the electromagnetic noise signals are inverted or flipped 180 degrees by an antiphase connection between the dummy read head and the first read head. This causes the noise on the first read head to be canceled out and allows the first read head to read track 2 of a magnetic strip on a card inserted into the slot 221.

In an embodiment, the first read head of the dual antiphase read head 222 is adjacent to and elevated above the dummy read head. This arrangements presents any skimmer redesign from reading track 1 or track 3 of a magnetic strip on a card inserted into the slot 221. Any skimmer inserted into the slot 221 will experience the electromagnetic noise and will not be able to read track 2 of the magnetic strip.

In an embodiment, the card reader 220 is the card reader 100 of FIGS. 1A and 1B. In an embodiment, the dual antiphase read head 222 is the read-head portion 100-1 and the disrupter portion 100-2.

In an embodiment, the terminal is an automated teller machine (ATM), a self-service terminal (SST), a point-of-sale (POS) terminal, a fuel pump kiosk, a travel kiosk, an entertainment kiosk, or an informational kiosk. In an embodiment, the card is a credit card, a debit card, a bank card, or a loyalty card.

Figure 3:
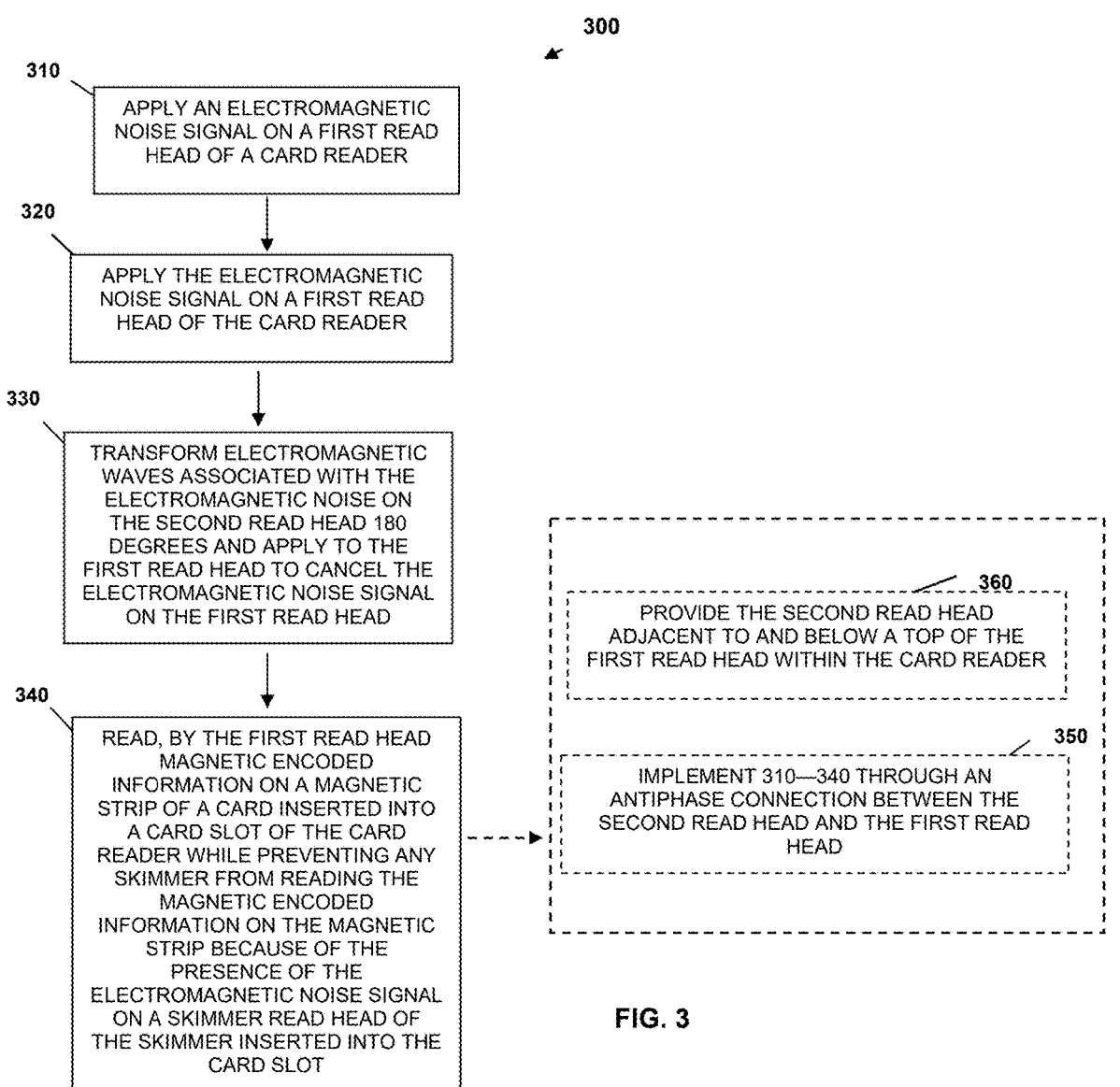
FIG. 3 is a diagram of a method for reading a card's magnetic strip while disrupting any skimmer from reading the card's magnetic strip, according to an example embodiment.

FIG. 3 is a diagram 300 of a method for reading a card's magnetic strip while disrupting any skimmer from reading the card's magnetic strip, according to an example embodiment.

At 310, an electromagnetic noise signal is applied on a first read head 103A of a card reader 100 or 220. Simultaneously, at 311, the electromagnetic noise signal is applied on a second read head 103B of the card reader 100. The electromagnetic noise signal may be generated from an external source 212 or an internal source 223 of the card reader 100 or 220.

At 330, electromagnetic waves associated with the electromagnetic noise on the second read head 103B is transformed 180 degrees and applied to the first read head 103A. This cancels the electromagnetic noise on the first read head 103A.

At 340, the first read head 103A reads magnetic encoded information on a magnetic strip of a card inserted into a card slot 221 of the card reader 100 or 220 while any skimmer is prevented from reading the magnetic encoded information on the magnetic strip because of the presence of the electromagnetic noise signal on a skimmer read head of the skimmer inserted into the card slot 221. That is, the noise is canceled for the first read head 103A of the card reader 100 or 220 but is still present on the skimmer read head which prevents the skimmer from reading the magnetic encoded information from the magnetic strip.

In an embodiment, at 350, the method 310-340 is implemented and provided through an antiphase connection between the second read head 103B and the first read head 103A. Thus, no software or even firmware is necessary to perform the method on the card reader 100 or 220 as the connections and arrangements of the read heads 103A and 103B and their terminals 101A, 102A, 101B, and 102B automatically transform the waves of the electromagnetic noise signal on the second read head 103B and applies the transformed waves on the first read head 103A using connections 104 and 105 to cancel out the electromagnetic noise signal experienced on the first read head 103A.

In an embodiment, at 360, the second read head 103B is provided adjacent to and below the top of the first read head 103A within the card reader 100 or 220. This is illustrated in FIG. 1B by the offset D. This also ensures that any skimmer designer is unable to redesign the skimmer's read head in such a way that track 1 or track 3 is readable by the redesigned skimmer.

Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
applying electromagnetic noise on read heads of a card reader;
canceling the electromagnetic noise on a first read head of the card reader; and
reading magnetic encoded information from a card using the first read head while the electromagnetic noise remains present on other read heads;
wherein the first read head is aligned to read a specific track of a card's magnetic strip.

2. The method of claim 1, wherein canceling the electromagnetic noise comprises transforming electromagnetic waves associated with the noise on a second read head and applying the transformed waves to the first read head.

3. The method of claim 1, wherein the first read head is part of a first read-head arrangement and a second read head is part of a second read-head arrangement, the first and second read-head arrangements being offset within the card reader.

4. The method of claim 3, wherein the first read-head arrangement is elevated above the second read-head arrangement.

5. The method of claim 1, wherein applying the electromagnetic noise comprises receiving the noise from a source external to the card reader.

6. The method of claim 1, wherein the card reader is a motorized card reader.

7. The method of claim 1, further comprising preventing a skimmer from reading the magnetic encoded information due to a presence of the electromagnetic noise.

8. The method of claim 1, wherein canceling the electromagnetic noise comprises using an antiphase connection between the first read head and another read head.

9. The method of claim 1, further comprising generating the electromagnetic noise using a disruptive circuit within the card reader.

10. The method of claim 1, wherein the first read head and at least one other read head are arranged in a dual antiphase configuration within the card reader.

11. A method, comprising:
providing a card reader with multiple read-head portions;
applying electromagnetic noise to the read-head portions;
canceling the electromagnetic noise on a first read-head portion; and
reading magnetic encoded information from a card using the first read-head portion while the electromagnetic noise remains on other read-head portions;
wherein the electromagnetic noise is generated by a component of the card reader or an external source.

12. The method of claim 11, wherein the first read-head portion is aligned to read a specific track of a card's magnetic strip.

13. The method of claim 11, wherein one read-head portion is elevated above another read-head portion.

14. The method of claim 11, wherein the card reader is integrated with a terminal selected from the group consisting of:
an automated teller machine (ATM), a self-service terminal (SST), a point-of-sale (POS) terminal, and a kiosk.

15. A method comprising:
providing a card reader with multiple read-head portions;
applying electromagnetic noise to the read-head portions;
canceling the electromagnetic noise on a first read-head portion;
reading magnetic encoded information from a card using the first read-head portion while the electromagnetic noise remains on other read-head portions; and preventing unauthorized reading of the magnetic encoded information due to a presence of the electromagnetic noise on the other read-head portions.

16. The method of claim 15, wherein canceling the electromagnetic noise on the first read-head portion comprises using an antiphase connection between the first read-head portion and another read-head portion.

\* \* \* \* \*